(12) United States Patent
Watkins

(10) Patent No.: US 6,563,303 B1
(45) Date of Patent: May 13, 2003

(54) METHODS AND COMPUTER EXECUTABLE INSTRUCTIONS FOR MARKING A DOWNHOLE ELONGATE LINE AND DETECTING SAME

(75) Inventor: Arthur D. Watkins, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/673,044

(22) PCT Filed: Apr. 13, 1999

(86) PCT No.: PCT/US99/08071

§ 371 (c)(1),
(2), (4) Date: Oct. 10, 2000

(87) PCT Pub. No.: WO99/52648

PCT Pub. Date: Oct. 21, 1999

Related U.S. Application Data (60) Provisional application No. 60/081,779, filed on Apr. 14, 1998.

(51) Int. Cl.[7] ................................................. G01B 7/04
(52) U.S. Cl. ..................................................... 324/206
(58) Field of Search .......................... 702/6, 166, 158; 166/254.1, 254.2, 66.5; 33/735; 324/207.2, 232, 206, 214, 333

(56) References Cited

U.S. PATENT DOCUMENTS

| | | | |
|---|---|---|---|
| 3,978,588 A | | 9/1976 | Richardson et al. |
| 4,188,413 A | * | 2/1980 | Lupinski et al. ............. 427/459 |
| 4,190,868 A | | 2/1980 | Moulin |
| 4,393,112 A | | 7/1983 | Honjo et al. |
| 4,570,348 A | | 2/1986 | Amsler et al. |
| 4,616,321 A | * | 10/1986 | Chan ............................. 702/9 |
| 4,790,208 A | | 12/1988 | Johnson |
| 4,806,863 A | | 2/1989 | White |
| 4,852,263 A | | 8/1989 | Kerr |
| 4,901,069 A | * | 2/1990 | Veneruso .................. 340/854.8 |
| 5,090,039 A | | 2/1992 | Gard et al. |
| 5,159,499 A | | 10/1992 | Goodman et al. |
| 5,206,065 A | * | 4/1993 | Rippingale et al. ........... 428/98 |
| 5,234,053 A | | 8/1993 | Connell |
| 5,303,592 A | | 4/1994 | Livingston |
| 5,321,361 A | * | 6/1994 | Goodman .................... 324/326 |
| 5,323,856 A | * | 6/1994 | Davis et al. ............. 166/253.1 |
| 5,428,293 A | * | 6/1995 | Sinclair et al. ............. 324/339 |
| 5,469,916 A | * | 11/1995 | Sas-Jaworsky et al. ........ 166/64 |
| 5,532,598 A | * | 7/1996 | Clark, Jr. et al. ........... 324/326 |
| 5,534,775 A | * | 7/1996 | Lam et al. .................. 324/216 |
| 5,546,672 A | | 8/1996 | Campbell et al. |
| 5,577,147 A | * | 11/1996 | Arroyo et al. .............. 385/109 |
| 5,667,924 A | | 9/1997 | Ziolo |
| 5,843,329 A | * | 12/1998 | Deetz ....................... 252/62.54 |
| 5,933,945 A | * | 8/1999 | Thomeer et al. .............. 29/825 |
| 6,012,521 A | * | 1/2000 | Zunkel et al. .............. 166/249 |

\* cited by examiner

Primary Examiner—John Barlow
Assistant Examiner—Demetrius Pretlow
(74) Attorney, Agent, or Firm—Workman Nydegger & Seeley

(57) ABSTRACT

Methods and computer executable instructions are provided for making an elongate line (22) with a plurality of marks (30) and detecting those marks (30) to determine a distance of the elongate line (22) in a downhole or a physical integrity thereof. In a preferred embodiment, each mark comprises a plurality of particles (44) having a substantially permanent magnetizing capability adhered to an exterior surface of the elongate line (22) at preselected intervals with an epoxy paint. The particles (44) are arranged at each interval as a plurality of bands (40). Thereafter, the particles are oriented into a magnetic signature for that interval by magnetizing the particles to create a magnetic field substantially normal to the exterior surface. This facilitates detection by a Hall effect probe. The magnetic signatures are stored in a computing configuration and, once a mark is detected, a correlation is made to a unique position on the elongate line by comparison with the stored magnetic signatures. Preferred particles include samarium-cobalt and neodymium-iron-boride.

51 Claims, 3 Drawing Sheets

METHODS AND COMPUTER EXECUTABLE INSTRUCTIONS FOR MARKING A DOWNHOLE ELONGATE LINE AND DETECTING SAME

RELATED APPLICATION

This application claims priority to PCT application S/N PCT\US99\08071, filed Apr. 13, 1999 and provisional application Ser. No. 60/081,779, filed Apr. 14, 1998.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates generally to downhole operations. More specifically the present invention relates to determining a downhole distance and physical integrity of a line, such as a coiled tube or a wireline, for the purpose of quantizing various effects such as defects, fatigue life, corrosion and payout for various tests, servicing or maintenance. Even more specifically, the present invention relates to methods and computer executable instructions for marking a downhole line and to the detection of same for correlation to the downhole distance and physical integrity.

2. Relevant Technology

During downhole operations in oil well boreholes, for example, it is often necessary to perform maintenance, distribute tools or deliver chemicals to various locations or positions therein having precise, yet differing depths. As such, it is important to know the appropriate depth or distance measurement to accomplish the appropriate objective. Depending upon the particular downhole operation, a downhole line such as a coiled tube or wireline will be inserted into the borehole to assist in the operation.

Conventionally, distance measurements are obtained from counting revolutions of wheels frictionally engaged with the line as the line is inserted into the borehole. With this method, however, only approximate distances are achieved because the wheels are subject to slippage. Although some methods are known for correcting slippage errors, the distance measurements are, at best, still fraught with erroneous data.

Since the wheels used to indicate the distance of the line inserted into the borehole, or payout, are usually above ground near the origination of the line payout, distance measurements are also adversely influenced by permanent or temporary elongation of the line due to load bearings imposed thereon that occur to the line after passing by the wheels. Frequently, this elongation is non-uniform which further introduces error into the payout measurement.

Because the line may be of varying composition, such as between steel or composite coiled tubing, correction factors which account for various loads introducing elongation into the line are often too inflexible to account for the changes as between line composition.

In some wireline technologies, wheel counter systems are replaced with magnetic marking systems for predicting payout measurements. One problem with these systems, however, is caused because the markings are usually emplaced in a non-permanent manner, such as with horseshoe magnets. Then, over time, the magnetic strength of the mark subsides and re-magnetizing operations are necessary. Temperature variations also cause subsiding of the magnetic strength. Again, re-magnetizing is required.

Another problem occurs because these magnetic markings are typically applied to the wireline, during use, as the wireline is fed into the borehole. Since the line is prone to slippage during this insertion period, the markings are potentially exposed to mis-marking thereof.

Still another problem occurs with these systems when measuring payout because the marks are non-descriptive. Thus, it is necessary to track and count these marks in relation to a starting position. This increases labor and system complexity.

Magnetic marking schemes are also used in some coiled tubing technologies, for example, in U.S. Pat. No. 5,469,916, a magnetic identifying mark (referred to as an indicia) is integrated into and resinously cured with the structure of the coiled tube during the manufacturing thereof. Adversely, this too requires the tracking and counting of the mark in relation to a starting position.

Since the marks of this system are introduced during, and integral to, the manufacturing processes, it is a further problem of this system that there is no robustness allowing for modifications or adaptation to the already numerous existing downhole lines.

It is also taught in this patent that magnetic marks wrapped in bands about the coiled tube can cause delamination, or other deteriorating damage, of the coiled tube structure over time if the band is too thick. Disadvantageously, this requires close-monitored quality control systems and fine-tolerance equipment during the manufacturing phase. All of which increase capital costs.

No matter which downhole magnetic marking technology is used, all are problematic when determining payout by counting marks if additional sections of line are spliced together with an older, existing line. This is because the spliced sections must be evenly fitted into the line in increments compatible with the marking schema or the payout counting will be inaccurate. Moreover, when spliced, an extensive history of the line must be transported with the line to other borehole sites to prevent future miscounting of the marks.

During all phases of the downhole operation from insertion through withdrawal, the line is subject to a severe mechanical and thermal environment having significant pressures, immense bending strains and temperature variations. As such, the line is vulnerable to cracking, fraying, thinning, diametral growth, fracture, corrosion and other detrimental problems which can diminish the physical integrity of the line and lead to very short fatigue lives. Although many prior art downhole systems are directed towards determining payout measurements, few are concerned with monitoring the foregoing. Even the ones concerned with monitoring these problems, however, are rudimentarily only interested with diameter and ovality. Yet, unfortunately, even these few when determining diameter and ovality often cannot accurately or reliably identify the section of line experiencing the difficulty.

Accordingly, it is desirous to overcome the foregoing shortcomings and provide improved methods for determining payout and integrity of a downhole line.

OBJECTS AND SUMMARY OF THE INVENTION

It is, therefore, an object of the present invention to provide improved systems and methods for marking a downhole line and detecting same for the purpose of determining payout and physical integrity.

It is another object of the present invention to provide improved systems and methods for marking a downhole line and detecting same that overcome slippage, elongation and track/count problems during payout.

It is still another object of the present invention to provide improved systems and methods for marking a downhole line and detecting same without adversely suffering from the effects of time and temperature.

It is yet another object of the present invention to provide improved systems and methods for marking a downhole line that can be accomplished at a time other than operational use to improve marking accuracy.

It is still yet another object of the present invention to provide improved systems and methods for marking a downhole line that can be adapted to existing downhole lines.

It is a further object of the present invention to provide easily applied systems and methods for marking a downhole line.

It is an even further object of the present invention to provide improved systems and methods for marking a downhole line that facilitates subsequent line splicing.

It is still a further object of the present invention to provide improved systems and methods for marking a downhole line and detecting same that leads to a comprehensive analysis of the physical integrity of the line.

It is a concomitant object of the present invention to provide economically inexpensive systems and methods for marking a downhole line and detecting same.

It is a further concomitant object of the present invention to provide computer executable instructions for achieving or facilitating some or all of the foregoing.

In accordance with the invention as embodied and broadly described herein, the foregoing and other objectives are achieved by providing methods and computer executable instructions for marking an elongate line, such as a coiled tube or a wireline cable, with a plurality of marks and detecting those marks for determining a distance of the elongate line in a downhole or an integrity thereof.

In a preferred embodiment, each mark comprises a plurality of particles having a substantially permanent magnetizing capability adhered to an exterior surface of the elongate line at preselected intervals with an epoxy paint. The particles are arranged at each preselected interval as a plurality of bands. Thereafter, the particles are oriented into a unique magnetic signature for that interval by magnetizing the particles in an appropriate manner to create a magnetic field substantially normal to the exterior surface. Since the mark detection is preferably a Hall effect probe, this facilitates the detection thereof. The magnetic signatures are stored and, once a mark is detected, a correlation is made to a unique position on the elongate line by comparison with the stored magnetic signatures. Preferred particles include samarium-cobalt and neodymium-iron-boride.

Thereafter, the marks can be used to correlate and track defect types and magnitudes, for example, observed as a result of an inspection of the line. Such tracking enables a history of the line to be established which provides for better corrosion control, maintenance and predictions of future occurring events such as expected fatigue life.

The method of applying a magnetic signature to an elongate line is such that this invention is readily adapted to existing elongate lines without requiring expensive manufacturing rework.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates to methods and computer executable instructions for marking an elongate line with a plurality of marks and detecting the marks for ultimately determining, in real-time, a distance of the elongate line in a downhole or a physical integrity thereof.

Figure 1:
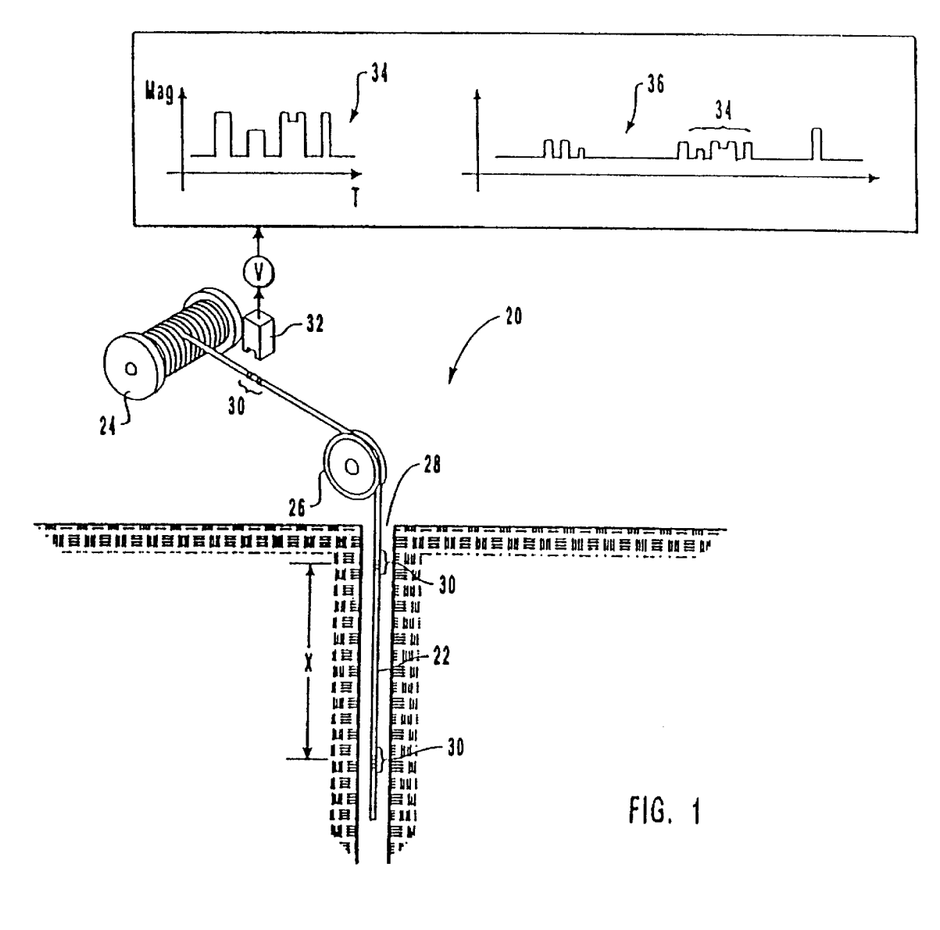
FIG. 1 is a diagram of a marked elongate line being inserted downhole with the marks being detected in accordance with the present invention.

With reference to FIG. 1, an elongate line installation and withdrawal arrangement is depicted generally as 20. Preferably the elongate line 22 refers to a coiled tube or a wireline logging cable useful in downhole operations such as those encountered in oil or gas well operations, but may additionally be any other conduit, pipe, wire, cable, rope or any other suitable device for insertion into a downhole. The elongate line 22 is stored on a reel or a spool 24 and wound or unwound by a suitable mechanism, such as a well known winch (not shown), and routed through various fittings, such as well known tractor feed mechanisms (not shown), and over a shoe 26 for insertion into or withdrawal from a borehole 28.

Along the elongate line 22 at intervals preselected according to the demands of the downhole operation (indicated by distance X) are a plurality of marks 30. During use, these marks are sensed by detection means, such as probe 32, as the marks are passed thereby during winding or unwinding of the spool for determining a distance of the elongate line 22 in the borehole 28. Although depicted as being outward from the borehole 28, the probe 32 could be positioned within the borehole. As described subsequently, since the marks are magnetized, the probe 32 is preferably a Hall effect probe for detecting a magnetic field produced by the marks. In means well known in the art, the Hall effect probe produces an output voltage, V, in proportion to a strength of the magnetic field.

Thereafter, the voltage, V, is converted into a signal 34 representative of the magnetic field of the mark. The signal may either be analog or digital and, in this embodiment, is digitized. It should be appreciated that a signal is generated for each mark 30 sensed by probe 32. Thus, over time, as a plurality of marks are sensed, the signal output converted from voltage, V, is exemplary indicated by a train of pulses as output 36 wherein signal 34 is but a few of the pulses. In a preferred embodiment, the interval X at which the marks are preselected is about 100 feet to which the spacing of pulses along signal 36 correspond, in time, according to the speed at which the marks bypass the probe 32.

As described in the background section, prior art systems determine distance from a marked elongate line by determining a starting mark and counting or tracking each successive mark therefrom. Advantageously, however, the present invention eliminates this track-and-count dependence because each mark 30 on elongate line 22 is unique. Thus, when sensed by probe 32, the signal generated therefrom is likewise unique from which a unique position along the elongate line can be readily determined by examining or sensing just one of the plurality of marks 30.

Figure 2:
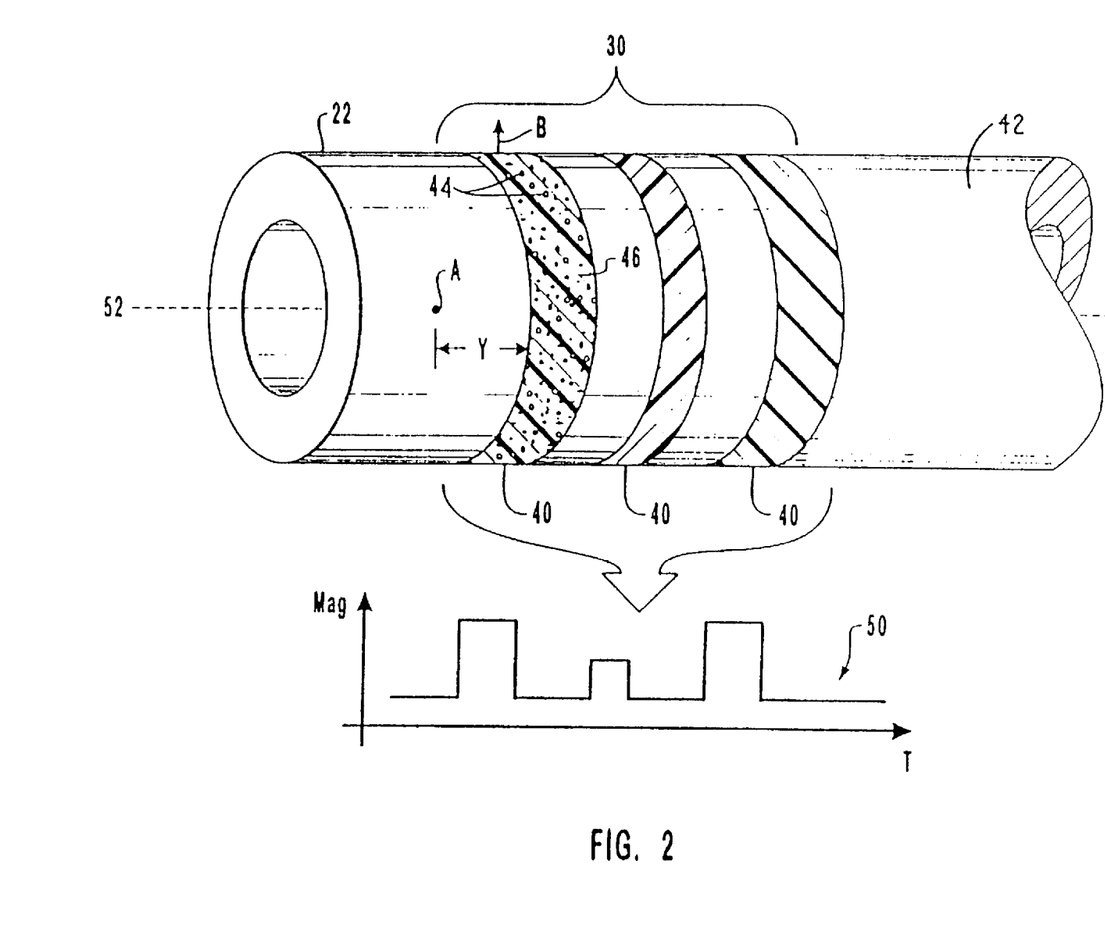
FIG. 2 is a exemplary diagram of a marked elongate line correlated to a magnetic signature.

In one of the preferred embodiments, illustrated in FIG. 2, this unique mark is achieved by applying a singular or a plurality of bands 40 to an exterior surface 42 of elongate line 22. In each band, but only depicted in the leftmost band, a plurality of particles 44 are adhered to the exterior surface 42 by an epoxy paint 46 or some other well known adherent. The particles 44 are formed of a hard magnetic material and applied without a magnetic state thereto. Once applied, the particles are magnetized by passing through a secondary magnetic field. This, together with the size, shape and number of bands 40, orients each mark into a magnetic signature unique according to its interval position preselected according to the demands of the downhole operation. An example of a magnetic signature converted from the bands 40 is shown generally as signal 50.

It should be appreciated that since each magnetic signature is predetermined, each magnetic signature can be correlated to an exact position on an elongate line. Then, each magnetic signature can be stored so that when probe 32 (FIG. 1) detects a mark 30, i.e., the magnetic field, the mark can be compared to the stored magnetic signatures for real-time determination about which mark is being sensed. Such comparisons are easily and quickly accomplished by means of various computing systems configurations.

In a preferred embodiment, the magnetic field emanating from the magnetized particles 44 is normal to the exterior surface 42 of the elongate line 22 as indicated by the B field vector. In this manner, the magnetic field is more easily sensed by the Hall effect probe. Some preferred particles include, but are not limited to, samarium-cobalt (SmCo) and neodymium-iron-boride. Advantageously, since these particles are hard magnetic particles, they will not lose their magnetic state over time which is unlike the prior art systems utilizing, non-permanent, horseshoe magnets, for example. Moreover, since the operating temperatures in typical downhole operations do not exceed the Curie temperature of these materials, these particles will not lose their charge from the effects of temperature either.

Preferably, the particles 40 are micron in size but are not necessarily required to be. The size could be any size permitting a magnetizing thereof that could ultimately be sensed by a detection means. In the micron range, particles are often provided as powders.

A magnetic signature unique to each preselected interval is advantageous not only because the track-and-count method of determining distance is avoided, but because slippage problems encountered by wheels are eliminated since the probe is not required to be in contact with the elongate line.

Another advantage with a magnetic signature is realized because application of a mark to an exterior surface of an elongate line easily enables adaptation of existing elongate lines. Now, existing elongate lines can simply be painted with uniquely arranged bands of magnetizable particles to simplify the methods of detecting downhole distance. Also, any traditional manufacturer of elongate lines can maintain their existing manufacturing methods and simply apply magnetic signatures thereafter to create a novel system for identifying marks.

Still other advantages realized by this invention include, but are not limited to: (i) improved marking accuracy because the application of marks occurs on a elongate line that is stationary and not being inserted into a downhole during use; and (ii) improved splicing accuracy because if an additional section of elongate line is desired to be inserted into an interior of the line, the added section can simply have a unique magnetic signature applied thereto without requiring additions of precisely measured elongate line. This also prevents the requirements of maintaining an extensive history for each splice.

Defect monitoring and fatigue life programs are also advantageously achieved with the present invention. For example, if upon inspection of the elongate line 22, a defect having a certain type and magnitude is discovered at position A, a detailed entry of the defect can be entered according to a spaced relation with the unique mark 30. Thus, defect A can be entered as a distance, Y, from some unique mark along the longitudinal axis indicated by dashed line 52. Other entry schemes are feasible and include, but are not limited to, vector magnitude/angular relationships and axial positions of the elongate line. Heretofore, such defect analysis is substantially non-existent because of the impractical nature of identifying exactly where on the elongate line the defect occurs.

This defect can then be entered into an appropriate computing system configuration for even further detailed analysis from which multiple inspection results can be used to compile a history of the elongate line. This history will even further allow for maintenance records, corrosion control and future calculations of useful events such as predictions of expected fatigue life. This is an advance over the present state of the art because existing systems merely use models and not quantitative information obtained directly from the sample under inspection. For brevity, this type of defect inspection and analysis will sometimes be referred to herein as an "integrity" or physical integrity of the elongate line.

Although not shown, it should be appreciated that conversion of voltage, V, into a signal from which comparisons can be quickly and efficaciously computed against magnetic signatures is preferably accomplished by a computing system configuration.

Figure 3:
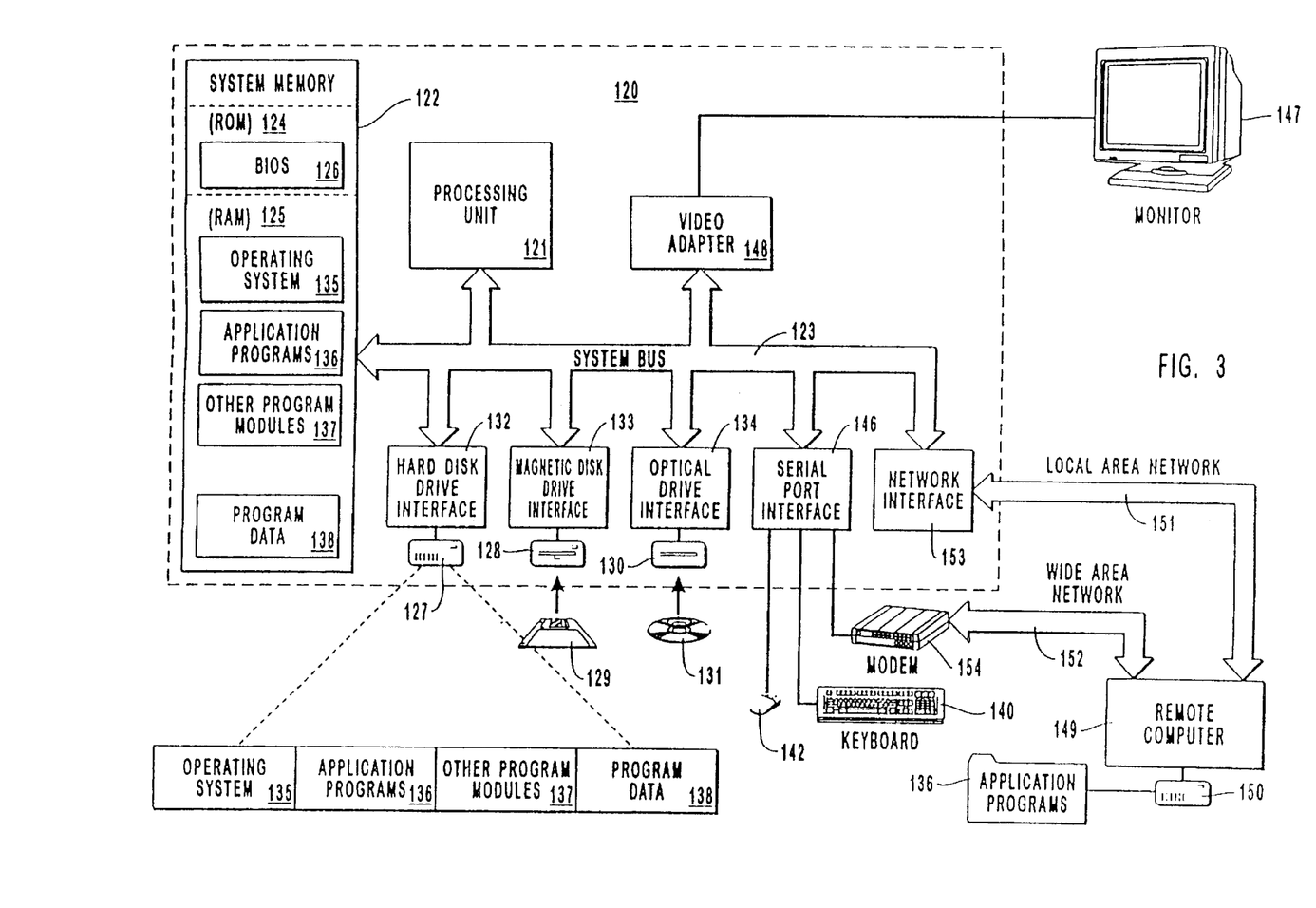
FIG. 3 is an exemplary system for providing a suitable operating environment for the present invention.

Accordingly, FIG. 3 is used herein to illustrate either the structure or processing of embodiments used to implement the system and method of the present invention. Using this figure in this manner to present the invention, however, should not be construed as limiting of its scope but merely as representative.

FIG. 3 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions.

When described in the context of computer readable media having computer executable instructions stored thereon, it is denoted that the instructions include program modules, routines, programs, objects, components, data structures, etc. that perform particular tasks or implement particular abstract data types upon or within various structures of the computing environment. Executable instructions exemplarily comprise instructions and data which cause a general purpose computer, special purpose computer, or special purpose processing device to perform a certain function or group of functions.

The computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by a general purpose or special purpose computer. Combinations of the above should also be included within the scope of computer readable media. For brevity, computer readable media having computer executable instructions may sometimes be referred to as "software" or "computer software."

With reference to FIG. 3, an exemplary system for implementing the invention includes a general purpose computing device in the form of a conventional computer 120. The computer 120 includes a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the computer 120, such as during start-up, may be stored in ROM 124. The computer 120 may also include a magnetic hard disk drive 127 for reading from and writing to a hard disk, not shown, a magnetic disk drive 128 for reading from or writing to a removable magnetic disk 129, and an optical disk drive 130 for reading from or writing to removable optical disk 131 such as a CD-ROM or other optical media. The hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the computer 120.

Although the exemplary environment described herein employs a hard disk, a removable magnetic disk 129 and a removable optical disk 131, it should be appreciated by those skilled in the art that other types of computer readable media which can store data accessible by a computer include magnetic cassettes, flash memory cards, digital video disks, Bernoulli cartridges, random access memories (RAMs), read only memories (ROM), and the like.

Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through input or interface selection devices such as a keyboard 140 and pointing device 142. Other input devices (not shown) may include a microphone, joy stick, game pad, satellite dish, scanner, or the like. These and other input devices are often connected to the processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as video adapter 148. In addition to the monitor, computers often include other peripheral output devices (not shown), such as speakers and printers. Scanners peripheral devices (not shown) for reading imagery into the computer are often also included.

The computer 120 may operate in a networked environment using logical connections to one or more other computing configurations, such as remote computer 149. Remote computer 149 may be a personal computer, a server, a router, a network PC, a peer device or other common network node, and typically includes many or all of the elements described above relative to the computer 120, although only a memory storage device 150 has been illustrated in FIG. 3. The logical connections depicted in FIG. 3 between the computer 120 and the remote computer 149 include a local area network (LAN) 151 and a wide area network (WAN) 152 that are presented here by way of example and not limitation. Such networking environments are commonplace in offices which enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the local or remote memory storage devices and may be linked to various processing devices for performing certain tasks. It will be appreciated that the network connections shown are exemplary and other means of establishing a communications link between the computers may be used.

Moreover, those skilled in the art will appreciate that the invention may be practiced with other computer system configurations, including hand-held devices, multiprocessor systems, microprocessor-based or programmable consumer electronics, network PCs, minicomputers, computer clusters mainframe computers, and the like.

One particular configuration found useful in detecting a marked elongate line for comparison against entered magnetic signatures includes, but is not limited to the following: (i) a Windows NT operating system, Microsoft Corp.; (ii) a LabVIEW for Windows graphical user interface device, National Instruments, Inc.; and (iii) a plurality of multifunction data acquisition boards, National Instruments Inc., to convert an analog representation of the voltage, V, i.e., the strength of the magnetic field of a mark, to a digital signal to facilitate computer-based signal processing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method of marking an elongate line with a plurality of marks, each said mark being detectably distinguishable from every other said mark, and detecting said marks for determining a distance of said elongate line in a downhole or an integrity of said elongate line, the method comprising:

applying a plurality of particles to an exterior surface of said elongate line at preselected intervals with paint;

orienting said applied particles at each said preselected interval into one of said marks;

sensing said marks with a probe as said marks are passed thereby; and correlating each said sensed mark to a corresponding position on said elongate line.

2. The method according to claim 1, wherein applying said particles further comprises adhering said particles to said exterior surface with an epoxy paint.

3. The method according to claim 2, wherein adhering said particles further comprises adhering said particles as a plurality of bands at each said preselected interval.

4. The method according to claim 3, wherein orienting said applied particles further comprises magnetizing said particles into a magnetic signature.

5. The method according to claim 4, wherein magnetizing said particles further comprises aligning a magnetic field of said particles into an orientation substantially normal to said exterior surface.

6. The method according to claim 5, wherein sensing said marks further comprises sensing each said magnetic field.

7. The method according to claim 6, wherein sensing each said magnetic field further comprises sensing with a Hall effect probe.

8. The method according to claim 6, wherein each said magnetic signature is digitized for storage in a computing configuration, further comprising digitizing each said sensed magnetic field to facilitate a comparison therebetween.

9. The method according to claim 4, wherein correlating each said sensed mark to said corresponding position further comprises associating each said magnetic signature to said corresponding position.

10. A method of marking an elongate line with a plurality of marks and detecting said marks for determining a distance of said elongate line in a downhole or an integrity of said elongate line, the method comprising:

applying a plurality of particles to said elongate line with paint at preselected intervals;

orienting said applied particles at each said preselected interval into a magnetic signature, each said magnetic signature being detectably distinguishable from every other said magnetic signature and each said magnetic signature being one of said marks;

associating each said magnetic signature to a position along said elongate line corresponding to one of said marks;

sensing said marks with a probe as said marks are passed thereby; and correlating each said sensed mark to said associated position on said elongate line.

11. The method according to claim 10, further comprising storing each said magnetic signature in a storage device.

12. The method according to claim 10, wherein sensing said marks further comprises sensing a magnetic field associated with each said magnetic signature.

13. The method according to claim 12, wherein sensing said magnetic field further comprises converting a strength of said magnetic field into a corresponding digital signal.

14. The method according to claim 13, further comprising storing said digital signal in a storage device.

15. The method according to claim 13, wherein correlating each said sensed mark to said associated position further comprises comparing each said digital signal to each said magnetic signature.

16. The method according to claim 10, further comprising inspecting said elongate line for said integrity.

17. The method according to claim 16, further comprising storing a result of said inspection in an axial relationship to said marks.

18. The method according to claim 16, further comprising predicting an expected fatigue life of said elongate line.

19. The method according to claim 16, further comprising compiling a history for said elongate line.

20. A method of marking an elongate line with a plurality of marks and detecting said marks for determining a distance of said elongate line in a downhole or an integrity of said elongate line, the method comprising:

adhering a plurality of particles having a substantially permanent magnetizing capability to an exterior surface of said elongate line at preselected intervals with an epoxy paint, said particles at each said preselected interval being adhered as a plurality of bands, said plurality of bands at each preselected interval being one of said marks;

magnetizing said particles of each said band into a magnetic signature having a magnetic field emanating substantially normal to said exterior surface;

associating each said magnetic signature to a separate position along said elongate line;

sensing said magnetic fields with a Hall effect probe as said marks are passed thereby; and correlating each said sensed magnetic field to said separate position on said elongate line by comparison with said magnetic signatures.

21. The method according to claim 20, further comprising storing said magnetic signatures in a storage device.

22. The method according to claim 20, further comprising converting each sensed magnetic field into a digitized signal to facilitate said comparison.

23. The method according to claim 20, further comprising inspecting said elongate line to determine said integrity thereof.

24. The method according to claim 23, wherein inspecting said elongate line to determine said integrity further comprises determining a defect type and magnitude.

25. The method according to claim 23, further comprising storing a result of said inspection to compile a history of said elongate line.

26. The method according to claim 20, further comprising inserting said elongate line into said downhole.

27. The method according to claim 26, further comprising withdrawing said elongate line from said downhole.

28. The method according to claim 20, wherein sensing further comprises sensing within or remote from said downhole.

29. A computer readable medium having computer executable instructions for performing the act of:
storing a plurality of magnetic signatures, each said magnetic signature corresponding to a plurality of magnetic particles arranged about an elongate line with paint at a preselected interval thereof;
correlating each said magnetic signature to a separate position on said elongate line;
receiving a signal input, said signal input corresponding to one of said magnetic signatures; and
comparing said signal input with said stored magnetic signatures to determine which said separate position said signal input corresponds to.

30. The computer readable medium according to claim 29, further comprising computer executable instructions for performing the act of receiving a result from an inspection performed on said elongate line.

31. The computer readable medium according to claim 30, further comprising computer executable instructions for performing the act of compiling a history of said elongate line.

32. The computer readable medium according to claim 30, further comprising computer executable instructions for performing the act of calculating an expected fatigue life of said elongate line from said result.

33. The computer readable medium according to claim 30, wherein said computer executable instructions for performing said act of receiving said result from said inspection further comprises computer executable instructions for performing the act of receiving a defect type and magnitude.

34. The computer readable medium according to claim 30, further comprising computer executable instructions for performing the act of storing said results in a storage device.

35. In a computer system having a graphical user interface device including a user interface selection device, a method for determining a position of an elongate line for use in a downhole, the method comprising:
receiving a plurality of magnetic signatures in response to an input from said user interface selection device, each said magnetic signature being detectably distinguishable from every other said magnetic signature;
correlating each said magnetic signature to a preselected interval along said elongate line, one of said preselected intervals being said position;
receiving a signal input corresponding to one of said magnetic signatures; and
comparing said signal input with said stored magnetic signatures to determine which said preselected interval on said elongate line said signal input corresponds to.

36. The method according to claim 35, further comprising receiving a result from said user interface selection device from an inspection performed on said elongate line.

37. The method according to claim 36, wherein said result comprises a defect type and magnitude, further comprising compiling a history of said elongate line.

38. The method according to claim 36, wherein receiving said result further comprises receiving said result in an axial relationship to one of said magnetic signatures.

39. An elongate line for use in a downhole, comprising:
an exterior surface; and
a plurality of marks arranged about said exterior surface of elongate at preselected intervals for detection by detection means, each said mark being detectably distinguishable from every other said mark, each said mark having a plurality of magnetized particles adhered to said exterior surface by an epoxy paint as an arrangement of a plurality of bands, said magnetized particles having a magnetic field emanating in a substantially normal orientation to said exterior surface.

40. The elongate line according to claim 39, wherein said particles are one of samarium-cobalt and neodymium-iron-boride.

41. A method of determining a position along a coiled tube where a defect is located, the method comprising:
applying a plurality of marks about said coiled tube, with paint each said mark being detectably distinguishable from every other said mark;
sensing said marks with a probe as said marks are passed thereby;
inspecting said coiled tube for said defects; and
if any said defects are found, correlating each said defect to one of said marks.

42. A method of marking an elongate line with a plurality of marks, each said mark being detectably distinguishable from every other said mark, and detecting said marks for determining a distance of said elongate line in a downhole or an integrity of said elongate line, the method comprising:
applying a plurality of particles to an exterior surface of said elongate line with paint at preselected intervals, wherein said particles are adhered to said exterior surface as a plurality of bands at each said preselected interval;
orienting said applied particles at each said preselected interval into one of said marks;
sensing said marks with a probe as said marks are passed thereby; and
correlating each said sensed mark to a corresponding position on said elongate line.

43. The method according to claim 42, wherein orienting said applied particles further comprises magnetizing said particles into a magnetic signature.

44. The method according to claim 43, wherein magnetizing said particles further comprises aligning a magnetic field of said particles into an orientation substantially normal to said exterior surface.

45. The method according to claim 44, wherein sensing said marks further comprises sensing each said magnetic field.

46. The method according to claim 45, wherein sensing each said magnetic field further comprises sensing with a Hall effect probe.

47. The method according to claim 45, wherein each said magnetic signature is digitized for storage in a computing configuration, further comprising digitizing each said sensed magnetic field to facilitate a comparison therebetween.

48. The method according to claim 43, wherein correlating each said sensed mark to said corresponding position further comprises associating each said magnetic signature to said corresponding position.

49. A method of marking an elongate line with a plurality of marks and detecting said marks for determining a distance of said elongate line in a downhole, the method comprising:
- applying a plurality of particles to said elongate line at preselected intervals;
- orienting said applied particles at each said preselected interval into a magnetic signature, each said magnetic signature being detectably distinguishable from every other said magnetic signature and each said magnetic signature being one of said marks;
- associating each said magnetic signature to a position along said elongate line corresponding to one of said marks;
- sensing said marks with a probe as said marks are passed thereby, wherein said probe senses a magnetic field associated with each said magnetic signature and converts a strength of said magnetic field into a corresponding digital signal; and
- correlating each said sensed mark to said associated position on said elongate line by comparing each said digital signal to each said magnetic signature.

50. A method of marking an elongate line with a plurality of marks and detecting said marks for determining an integrity of said elongate line, the method comprising:
- applying a plurality of particles to said elongate line at preselected intervals;
- orienting said applied particles at each said preselected interval into a magnetic signature, each said magnetic signature being detectably distinguishable from every other said magnetic signature and each said magnetic signature being one of said marks;
- inspecting said elongate line for said integrity and storing a result of said inspection in an axial relationship to said marks;
- associating each said magnetic signature to a position along said elongate line corresponding to one of said marks;
- sensing said marks with a probe as said marks are passed thereby; and
- correlating each said sensed mark to said associated position on said elongate line.

51. The method according to claim 50, further comprising the method of predicting an expected fatigue life of said elongate line.

\* \* \* \* \*